(12) United States Patent
Anderson

(10) Patent No.: US 7,562,167 B2
(45) Date of Patent: Jul. 14, 2009

(54) MANAGING HETEROGENEOUS DATA STREAMS FOR REMOTE ACCESS

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 367 days.

(21) Appl. No.: 11/273,551

(22) Filed: Nov. 14, 2005

(65) Prior Publication Data

US 2007/0130302 A1     Jun. 7, 2007

(51) Int. Cl.
*G06F 3/00* (2006.01)
*G06F 15/00* (2006.01)
*G06F 9/32* (2006.01)
*H04Q 3/00* (2006.01)

(52) U.S. Cl. .................. 710/38; 706/16; 706/19; 340/2.1; 340/2.7

(58) Field of Classification Search .............. 710/38
See application file for complete search history.

(56) References Cited

U.S. PATENT DOCUMENTS

| | | | |
|---|---|---|---|
| 6,356,841 B1 * | 3/2002 | Hamrick et al. .............. 701/213 |
| 6,813,571 B2 | 11/2004 | Lightbody et al. ............. 702/62 |
| 6,975,928 B2 * | 12/2005 | Timko et al. .................. 701/29 |
| 6,983,200 B2 | 1/2006 | Bodin et al. |
| 7,050,897 B2 * | 5/2006 | Breed et al. .................... 701/46 |
| 2004/0029612 A1 * | 2/2004 | Gorsuch .................. 455/552.1 |
| 2005/0187643 A1 * | 8/2005 | Sayyar-Rodsari et al. ..... 700/29 |
| 2006/0173976 A1 * | 8/2006 | Vincent et al. .............. 709/220 |

* cited by examiner

*Primary Examiner*—Niketa I Patel
*Assistant Examiner*—Zachary K Huson
(74) *Attorney, Agent, or Firm*—Yee & Associates, P.C.; Marilyn Smith Dawkins

(57) ABSTRACT

The present invention relates to a system and method for intelligent computer-implemented transmittal of data, the system determining and using the best available method of transmission for the data In determining the best available transmission method, the system considers at least one of available transmission methods at a particular site, transmission cost, data type, and data security.

7 Claims, 4 Drawing Sheets

MANAGING HETEROGENEOUS DATA STREAMS FOR REMOTE ACCESS

FIELD OF THE INVENTION

The present invention relates to a system and method for intelligent computer-implemented transmittal of data, the system determining and using the best available method of transmission for the data. In determining the best available transmission method, the system considers at least one of: available transmission methods at a particular site, data transfer rate, transmission cost, data type, and data security.

BACKGROUND OF THE INVENTION

As more and more data becomes available in electronic form, accessing such data electronically is becoming more and more popular. It is desirable to provide users access to electronic information on-demand. While use of the internet and world wide web has simplified making data generally accessible, for security purposes, many persons and companies prefer to keep their data in a central source that can only be accessed by certain persons, rather than the general public. In either situation, while access to the information from a specific location that has an established data connection that is used repeatedly is simple and virtually transparent to the user, the choice of access method is not always so simple when a user is seeking to access information from a remote location. In such situations, the standard access method typically used may not be available, although there may be other access methods available, or the user may be using a different access tool than s/he typically uses, and thus not even be aware of the various access methods available.

Such situations are occurring more and more frequently in our increasingly mobile society. These issues are particularly true where users are geographically scattered, and/or accessing data from various field locations in which the standard high-speed connections to the data source may not be available. This is often seen with field service technicians for various equipment that may be located in a building, or outside, or various other remote areas, and high-speed connections to the data source are not available. It is difficult for a user at a remote location to know what data connections are available at that location, or to determine the best connection method to use in a particular situation.

SUMMARY OF THE INVENTION

The present invention provides a method and system for determining the various data access connections available at a particular location, evaluating the file or files that need to be downloaded, if any, and selecting the best method for the data access connection based on one or more of: the characteristics of the files that needs to be transmitted or downloaded, connection costs, connection speeds, data transfer rates, and/or other factors. It should be noted that files can be one or more of a variety of types of information, such as, but not limited to text files, spreadsheets, audio files, pictures, video files, drawing files, or composite files that comprise more than one element. When a person is at a "home" or "base" location, the various communication channel options are generally known, and a user can select the best method for sending or receiving communications/data, depending on the data. However, as our society becomes more and more mobile, a person often finds themselves in an unfamiliar or new area, with a need to send or receive specific data. There is often a need to find, identify and select a specific communication channel and type to enable the best mode for sending or receiving specific data. The present invention will help streamline work and improve work efficiency by identifying various data connections available, calculating costs and time for various types of data connections for the file or files to be sent or received, even taking security issues into consideration as necessary. In some arrangements of the present invention, after performing the various analyses, the system will automatically select the best connection available for the files, and initiate the data transfer.

It can be appreciated that various arrangements of the present invention would be useful in different environments or with different equipment or users. The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

The invention disclosed is for a system for managing access to heterogeneous data stored in at least one remote location having a microprocessor-based device capable of storing, sending or retrieving data, the system having software capable of identifying data connections installed and operable on the microprocessor-based device, the software capable of analyzing the identified data connections available to the end user at the remote location, measuring at least one of data connection speed, connection cost, battery use, security of the connection, and prior connections, the software using the analysis performed to assign a priority to each relevant data connection available based on the efficiency of the data connection; and implementing a data transfer using the best data connection identified.

The invention disclosed also incorporates method for managing access to heterogeneous data stored in at least one remote location, comprising identifying at least two data connections available to an end user at a location to the remote location where the heterogeneous data is stored, analyzing the data connections available to the end user at the remote location, measuring at least one of data connection speed, connection cost, battery use, prior connections, and security of the connection, using the analysis performed to assign a priority to each relevant data connection available, and when a data transfer needs to occur, calculating the best data connection to use for that data transfer, taking into consideration the analysis and prioritization performed, then implementing the data transfer using the best data connection identified.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENT

Figure 1:
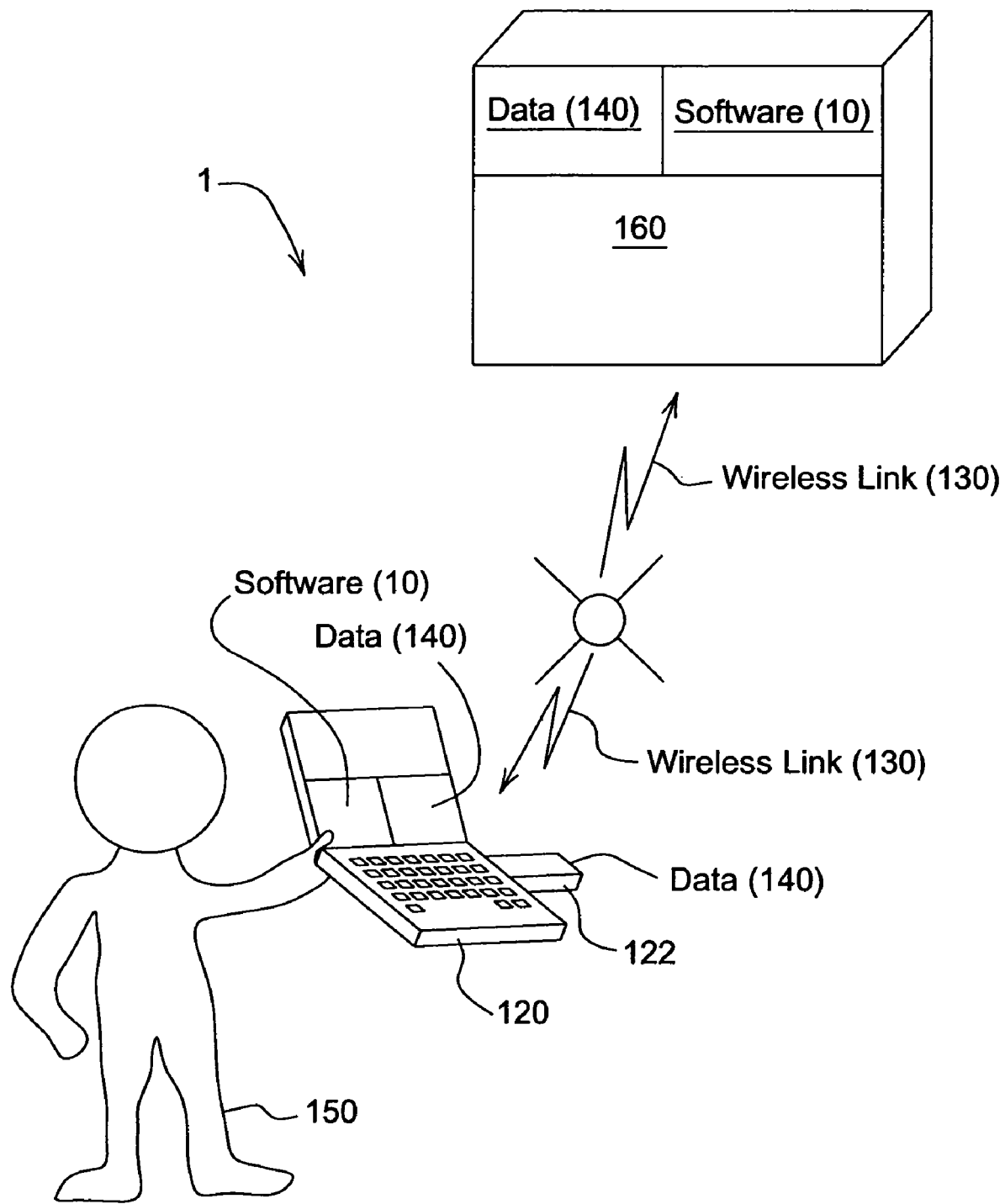
FIG. 1 is a schematic representation of a system for managing heterogeneous data streams of the present invention.

In the discussion of the FIGURES the same reference numerals will be used throughout to refer to the same or similar components. In the interest of conciseness, various other components known to the art, such as computer processing and storage mechanisms and the like necessary for the operation of the invention, have not been shown or discussed, or are shown in block form.

In the following, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning computer and database operation and the like have been omitted inasmuch as such details are not considered necessary to obtain a complete understanding of the present invention, and are considered to be within the knowledge of persons of ordinary skill in the relevant art.

Refer now to the drawings wherein depicted elements are, for the sake of clarity, not necessarily shown to scale and wherein like or similar elements are designated by the same reference numeral through the several views.

FIG. 1 shows a system 1 of the present invention for managing heterogeneous data streams for remote access. The software 10 of the present invention can be used on one or more microprocessor-based devices 120 capable of sending or receiving information via one or more wireless communication channels 130. Such microprocessor-based devices 120 include, but are not limited to, computers, PDAs, cellular telephones, digital cameras, remote access devices, vehicular electronic control units, and terminals. A variety of short- and long-range wireless communication links 130 are available, with the options increasing continuously. Current options for wireless communication channels 130 include, but are not limited to: low bandwidth, long range analog cellular, Bluetooth™, wireless ethernet, high speed digital cellular (eg 3G), dedicated radio frequency (RF) channels, broadband communications, Voice Over Internet Protocol (VOIP) and Worldwide Interoperability for Microwave Access (WiMax).

When a situation arises in which the user 150 of a microprocessor-based device 120 needs to send or receive data 140, it may become necessary to find, identify and select a specific wireless communication channel 130 to enable the best mode for sending or receiving the specific data 140. It can be appreciated that the data can reside on the user's microprocessor-based device 120, or on a storage mechanism 122 connected to or accessible by the microprocessor-based device, or on one or more remote computerized device 160 that has electronic data storage for storing data 140 thereon, the device(s) 160 capable of being connected to a wireless communication channel 130, either directly or indirectly. As shown in FIG. 1, the remote computerized device 160 can also have the software 10 installed thereon, but it is not necessary, so long as the software 10 is installed on the user's microprocessor-based device.

Identifying, analyzing and selecting the most efficient mode of connecting for the data being transported is complex, involving considerations of availability, cost, security, etc. Effectively finding, selecting and using these channels can impact user efficiency. Exactly which channels and protocols are available will depend on geographic location and what subscriptions are available to various services. With respect to performance, there may be certain data types such as video that require bandwidth or protocol requirements to be effective. A variety of standards and laws are in place regarding long-range and short-range wireless communication, depending on technology and data protocols.

Figure 2:
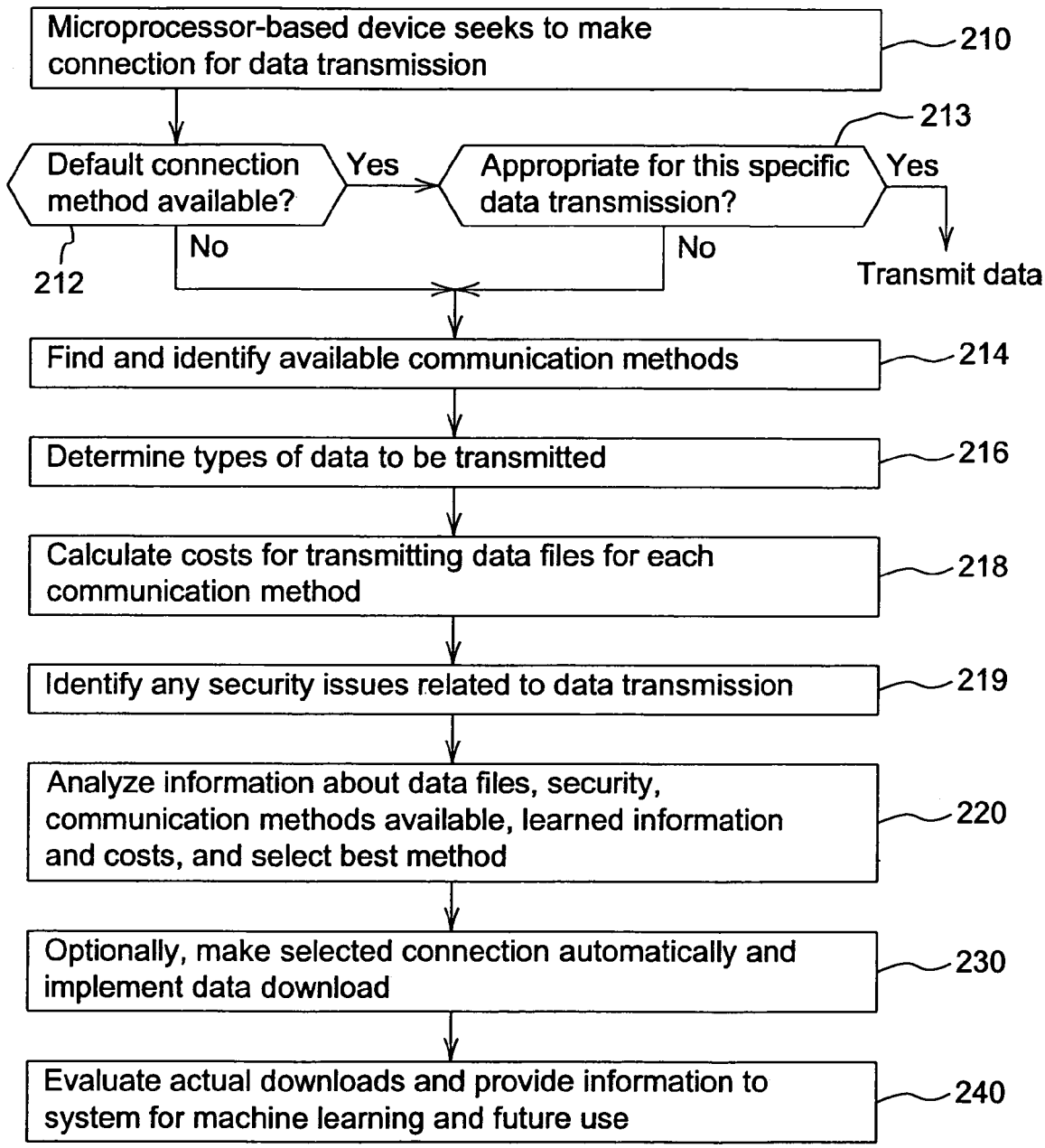
FIG. 2 is a block diagram of a system for managing heterogeneous data streams of the present invention.

The present invention is designed to automatically analyze and configure data routing from a device at a first site to a second site to minimize cost, maximize data transfer rates, and if appropriate, maximize battery life, as constrained by security issues. As shown in step 210 of FIG. 2, the system 1 of the present invention is implemented when a microprocessor-based device 120 utilizing the software 10 of the present invention seeks to make a short- or long-range wireless communication connection for the purpose of transmitting data. The software 10 begins by determining at step 212 if the default connection method for this microprocessor based device 120 is available. If so, at step 213, the system will determine if the default connection method is appropriate for the specific data to be transmitted, and if so, will initiate the data transmission. If the default connection method is not appropriate for the specific data to be transmitted, or if the default connection method is not available, then the software 10 of the present invention will begin the process of finding available connection methods and selecting the best method for transmitting the data.

At step 214, the software 10 will use computerized algorithm(s) to find what data connections are available to the microprocessor-based device 120 at its present geographic location.

At step 216 the software 10 will use computerized algorithms to identify the data files 140 that need to be transmitted, determining information such as size, type, location, source and download speed over the various data connections available to the microprocessor 120. It should be appreciated that in some cases, the data files 140 to be transmitted may reside on the user's microprocessor 120, or on some other computerized device 160 that has electronic storage, or both. Similarly, the software 10 may reside on the user's microprocessor, the computerized device 160, or both.

At step 218, the software 10 will perform calculations to determine the costs for the various connections for the data files 140, taking into consideration the speed of the microprocessor 120, and download capabilities. This invention optimizes channel use, subject to performance constraints. Performance constraints include, but are not limited to, response time due to communication bandwidth. For example, if a particular file can only be downloaded over one particular type of connection, which is available, then that connection type will be used to download that data. However, if there are multiple ways that can be used to download a particular data file, the system will look at cost for each connection type, and estimate download times. The system 1 will generate information about the various connections available, including costs and projected duration of the various downloads.

At step 219, if there are security issues for any of the data 140 that needs to be transmitted, the system will identify these issues for each data file 140. It can be appreciated that this feature is optional, and may not be available or used in all arrangements of the present invention. With respect to security, for example, in the U.S., dedicated telephone service has a higher level of security than Voice Over Internet Protocol ("VOIP"). However, encryption of data can often be more efficiently implemented on an IP connection then a standard wired or cell phone.

At step 220, the system will collect the results obtained in steps 214 through 219 and use one or more computerized algorithms to select the best available download method for each data file 140, taking into consideration one or more factors, including but not limited to access methods available, data transfer time, data transfer cost, etc. When performing these analyses, the software 10 of the present invention can also take into consideration information obtained through machine learning from previous activities, and can even take current, immediate information into consideration. For example, if there is a current equipment outage at a specific location, or weather-related conditions that are impacting one or more communication links, the software 10, upon receiving notification of the outage or weather-related condition, would know to avoid that method or methods of data transfer until the equipment has been fixed or the weather conditions have changed.

At step 230, if the system is configured to perform the transfers automatically, the system will make the selected connection and perform the transfer, using the method that was determined to be best. To perform the data transfer, a connection will have to be made between the user's microprocessor 120 and the device 160. Connection formation and any needed authentication is generally as transparent as possible to the human user. In some arrangements of the present invention, the human user 150 of the microprocessor 120 may also be identified and authenticated so they have access to appropriate data or a customized user interface (e.g. level of detail, language, experience/skill assumption for instructions).

At step 240, information collected during the analysis, and if performed, the transfer, is further-analyzed by the software 10. The software 10 of the present invention is capable of machine learning, and the system will learn from these previous analyses to more accurately identify and assess data files and determine access methods available at a location, how long transfers actually take, costs for a transfer, etc, as shown in step 240. The analysis done in this step is used by the software 10 during subsequent data routing to enable it to perform more accurate analyses, taking this information learned from previous data routing into consideration.

Figure 3:
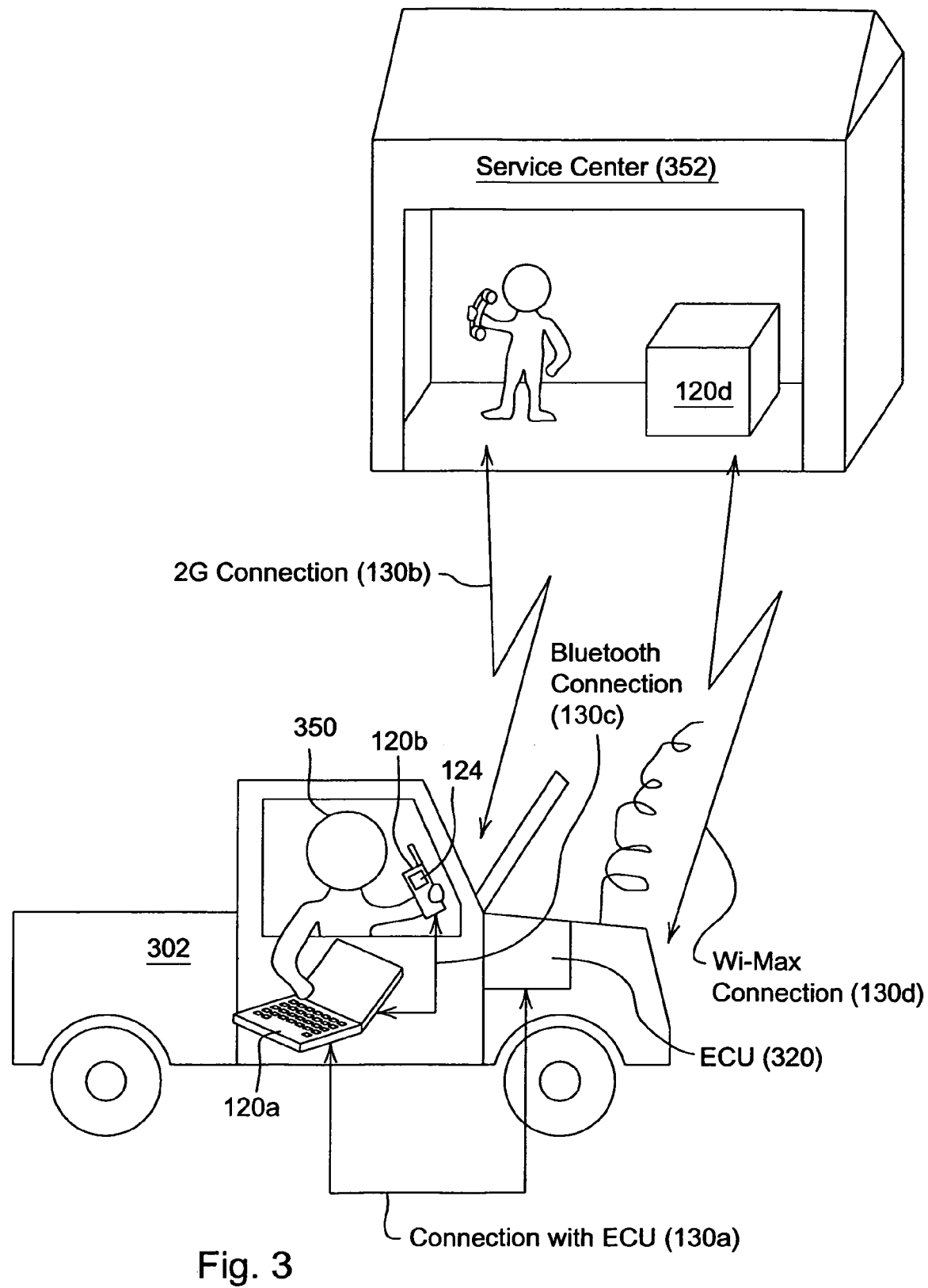
FIG. 3 is a block diagram of an exemplary system for managing heterogeneous data streams of the present invention.
Figure 4:
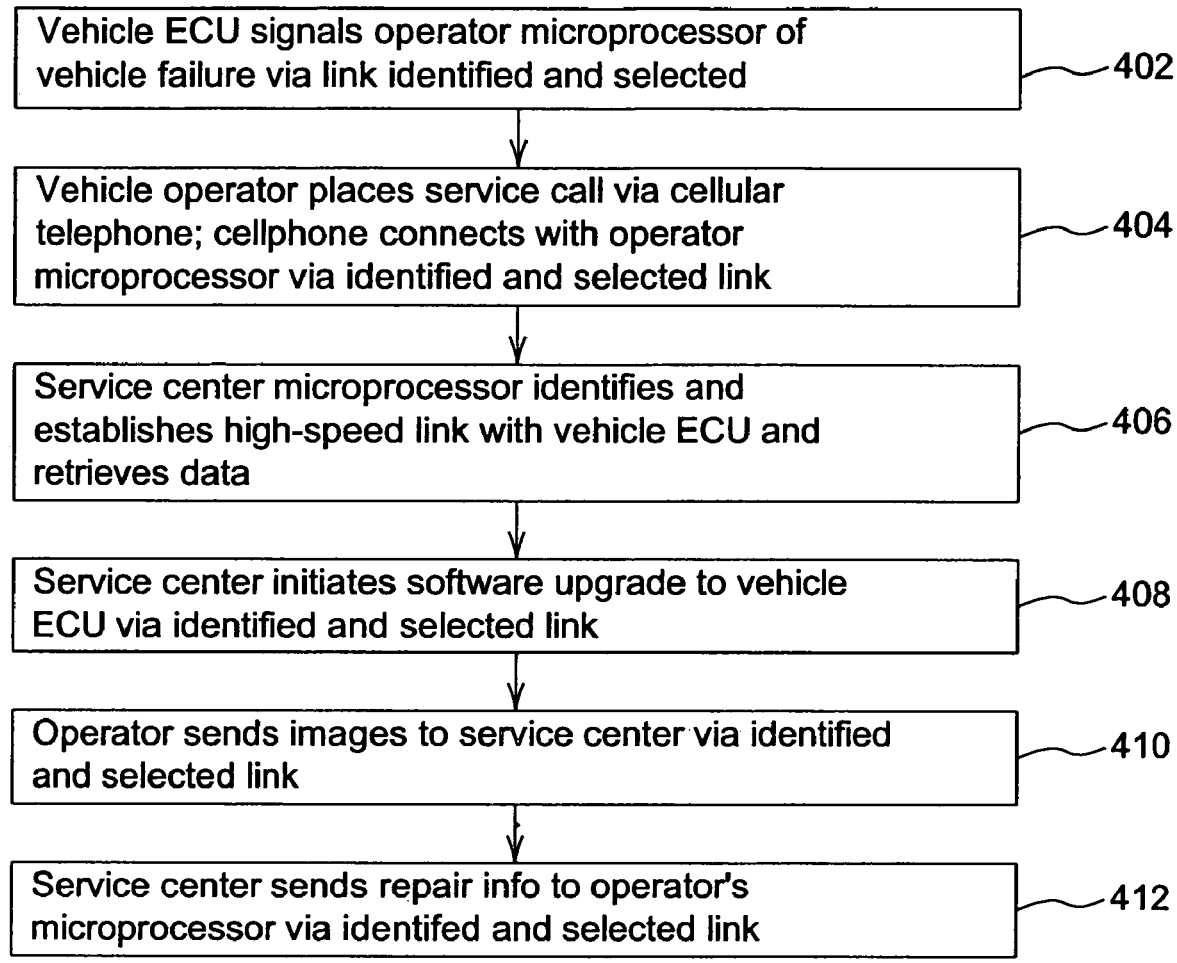
FIG. 4 is a schematic representation managing heterogeneous data streams as in the present invention.

FIGS. 3 and 4 provide a specific example of one embodiment of the system 1 of the present invention. It should be considered that the principles disclosed herein extend beyond the particulars of this specific example. This example is directed to an instance in which a piece of equipment 302 in a remote geographic area is experiencing a failure. The vehicle operator 350 has at least one device capable of long-range wireless communications, and at least one device capable of short-range wireless communications, although it can be appreciated that in some arrangements, the same device could be capable of both long-range and short-range communications. The devices each have installed the software 10 of the present invention, which is capable of finding, identifying and analyzing the various communication methods available to the device.

The vehicle 302 has at least one electronic control unit (ECU) 320 that can collect, receive, and/or store information about the vehicle 302, such as the vehicle identification number (VIN), diagnostic trouble codes, vehicle parameters, etc. The ECU 320 is capable of communicating with one or more external devices by means of short-range and/or long-range wireless communications. In this case, the ECU 320 is capable of both long-range and short-range communications.

In this example, as can be seen in step 402 of FIG. 4, when the vehicle 302 experiences a failure, the ECU 320 collects data indicating that a problem exists. The ECU 320 has installed the software 10 of the present invention, which identifies the various wireless links available at the location of the vehicle 302, and the attributes of each link, including in this case, any specified parameters, the cost, throughput type, battery use, and any security issues. In this case, the ECU 320 has been configured to send notice of any failures to the vehicle operator 350. The ECU 320 determines the methods available to contact the vehicle operator 350, and the various attributes of each of these methods, and selects the best method. In this case, the ECU 320 sends a signal that it is experiencing a failure to the vehicle operator's microprocessor 120a, by means of a secure, high-speed short-range 802.11 link 130a. Note that the method of the vehicle sending a failure signal, and to whom the signal is sent can be one of a variety of ways other than the one disclosed in this example, including, but not limited to, such methods as the vehicle sending a signal directly to a service center, or signaling both the service center and the vehicle operator 350, or a direct wired connection between the ECU 320 and the operator's microprocessor 120a. Assume an 802.11 link 130a having a data transfer rate of 11 Mps for this example.

In this example, the vehicle operator 350, after examining the vehicle 302, decides to seek further assistance to resolve the problem, and uses his/her digital cellular telephone 120b to place a service call to a service center 352, as shown at step 404. The digital cell phone 120b, in establishing this link, uses the software 10 of the present invention, which is installed on the cellular telephone 120b, to identify the various wireless links available at the location of the vehicle 302, and the attributes of each link, including in this case, the cost, throughput type, battery use, and any security issues. A digital cell phone link 130b is established between the operator cell phone 120b and the service center 352. Assume the digital cell phone link 130b is via a 2G phone at 28 Kbs. Simultaneously, the digital cell phone 120b establishes a Bluetooth™ connection 130c between itself and the vehicle operator's microprocessor 120a, which is in communication with and has received information from the vehicle ECU 320. This connection can be used to relay data between the digital cell phone 120b, the service center 352, and/or the vehicle operator's microprocessor 120a, as needed. Assume the Bluetooth™ connection rate 130c is at 700 Kbs for data and 50 Kbs for audio.

At step 406, the service center 352 enters data about the service call into the service center microprocessor 120d. The service center microprocessor 120d has the software 10 of the present invention installed thereon. The service center microprocessor 120d can be a single processing and storage device, or it could be a distributed system. It performs a query to identify the long-range communication methods available for communication with the vehicle 302. The software 10 performs an analysis of the various communication links, and based on the data it wishes to download to/from the vehicle 302, determines that an available Wi-Max communication channel is best-suited. The service center microprocessor 120d, opens a long-range 70 Mbs Wi-Max link 130d between the vehicle's electronic control unit 320 and the service center microprocessor 120d. The 2G digital connection 130b is maintained for voice communication between the vehicle operator's cell phone 120b and the service center 352, but now data to be transferred can travel via the Wi-Max connection 130d to the service center microprocessor 120d, as appropriate. The data may include, but is not limited to, vehicle drawings, diagnostics procedures, configuration and calibration information, service history, vehicle parameters, etc.

If the operator 350 had a combined digital terminal/cellular telephone 120b' (not shown), the system of the present invention could terminate the 2G phone link 130b, and also route voice communications via the 802.11 link 130a.

At step 408, assume the service center 352, after reviewing the data received from the ECU 320, determines that a software upgrade to the vehicle 302 is necessary. The software code is confidential, and so security protection for the data transmission is a concern. The service center microprocessor 120d performs an analysis 10, and determines that the best way to update the vehicle software is to establish a virtual private network (VPN) between itself and the vehicle 302 for transmission of the software upgrade. The service center microprocessor 120d will initialize encryption of the software upgrade code so it can be transmitted over the Wi-Max link 130d, for a secure, high bandwidth download of the software upgrade.

At step 410, assume the software upgrade did not completely solve the problem, and so communications occur between the service center microprocessor 120d and the vehicle ECU 320. The service center requests a visual verification of the state of various jumpers on the vehicle ECU 320 to further determine the source of the problem. The service center 352 requests the vehicle operator 350 that such information is needed. The operator indicates that his cell phone 120b is equipped with a camera 124, which he uses to take a photograph of the equipment as directed by the service center 352. The photographic images could then be routed to the service center 352 via the Bluetooth™ connection 130c; 802.11 link 130a, or Wi-Max connection 130d for reduced transmission latency compared with sending over the relatively low speed 2G digital link 130b. The software 10 of the present invention analyzes the various connection methods available, and based on the analysis, selects the best method for transferring the data images. In this case, assume the system selects the 802.11 link as the best method of transferring the data file, and automatically initiates the download.

After reviewing the image sent by the operator 350, the service center 352 determines that a jumper on one of the circuit boards is missing. At step 412, the service center 352 sends the operator 350 instructions as to how and where to insert the replacement jumper. The software 10 of the present invention analyzes the various connection methods available, and based on the analysis, selects the best method for transferring the repair data. In this case, assume the system selects the Wi-Max link as the best method of transferring the data from the service center microprocessor 120d to the location of the broken vehicle 302. The operator's microprocessor 120a does not have the capability of establishing a Wi-Max link. However, a Wi-Max link 130d already exists between the vehicle ECU 320 and the service center microprocessor 120d. The software 10 determined that the most cost-efficient transfer is to send the data from the service center microprocessor 120d to the vehicle ECU 320 via the Wi-Max link and from the vehicle ECU to the operator's microprocessor 120a via the existing 802.11 link. The service center microprocessor 120d automatically establishes the connection and initiates the download to the ECU 320, along with instructions for it to subsequently be transferred to the operator's microprocessor 120a. Once the information has been transferred to the ECU 320, the data is then automatically transferred from there to the operator's microprocessor 120a via the short-range 802.11 link 130a that is already established. It can be appreciated that this could be a wired or wireless link. Once this repair is done, the vehicle ECU 320 determines that the vehicle is operative again. The connections between the various devices are terminated, and the vehicle 302 can resume operation.

In this example, the vehicle ECU 320, operator's microprocessor 120a, operator's cellular telephone 120b, and service center microprocessor 120d all had the software 10 of the present invention installed, which enabled them to find available data connections, calculate costs associated with each connection type, and select the most efficient method of communication without the human needing to know the exact path taken by the data being transmitted between the devices, taking security issues into consideration when appropriate. Data sent from any device (node) to any other device (node) could be done at the lowest cost subject to security, performance, and other constraints by utilizing the software 10 of the present invention. Each node had knowledge of the network configuration, network attributes, node I/O and processing capability, and could automatically route data accordingly so the human agents could work most efficiently, with the background analysis and selection being done in the most transparent method possible to minimize work performed by the human agents.

It is understood that the present invention can take many forms and embodiments. Accordingly, several variations may be made in the foregoing without departing from the spirit or the scope of the invention. Having described the preferred embodiment, it will become apparent that various modifications can be made without departing from the scope of the invention as defined in the accompanying claims.

I claim:

1. A method for communicating vehicle data between an electronic control unit of a vehicle and a service center microprocessor, comprising:

identifying, by the electronic control unit, a first set of communication links available at a location of the vehicle and attributes of each communication link of the first set of communication links; determining if a notice of vehicle information is to be sent to an operator of the vehicle having access to at least one communication device having at least one communication link with the electronic control unit; and responsive to determining that a notice of vehicle information is to be sent to the operator of the vehicle, i) selecting a first method to contact the operator of the vehicle based on at least one attribute of each available communication link of the first set of communication links; and ii) sending a first signal having the notice of vehicle information from the electronic control unit to a first communication device of the at least one communication device of the vehicle operator via the selected first method; determining if the notice of vehicle information is to also be sent to a service center microprocessor; responsive to determining that the notice of vehicle information is to also be sent to the service center microprocessor, identifying, by a second communication device of the at least one communication device of the vehicle operator, a second set of communication links available between the second communication device and a communication device of the service center and attributes of each communication link of the second set of communication links; selecting a second method to contact the service center based on at least one attribute of each available second communication link of the second set of communication links; sending a second signal having the notice of vehicle information from the second communication device of the vehicle operator to the service center communication device via the selected second method; responsive to the service center microprocessor determining that a software upgrade of the vehicle is necessary, identifying a third communication link available between the service center microprocessor and the electronic control unit and attributes of the third communication link and downloading the software upgrade from the service center microprocessor to the electronic control unit via the third communication link.

2. The method of claim 1 further comprising:

establishing a first communication link of the second set of communication links from the second communication device of the vehicle operator to the service center communication device at the service center based on at least one attribute; and establishing a second communication link of the second set of communication links from the second communication device of the vehicle operator with the first communication device of the vehicle operator which has received the vehicle information from the electronic control unit, wherein the second communication link has a second communication instance of time that is simultaneous with a first connection instance of time of the first communication link.

3. The method of claim 2 wherein the first and second communication devices are a same device having a combined digital terminal and cellular telephone wherein voice communications to the service center communication device are routed over a 802.11 link of the same device.

4. The method of claim 1 wherein data is sent from the service center microprocessor to the electronic control unit with instructions to subsequently transfer the data to a vehicle operator microprocessor.

5. The method of claim 4 wherein the data is sent with instructions if the service center microprocessor identifies a better communication link from the service center microprocessor to the electronic control unit than a different communication link directly from the service center microprocessor to the vehicle operator microprocessor based on attributes of the communication links.

6. The method of claim 1 wherein attributes of each communication link of the first set of communication links includes a battery use attribute.

7. The method of claim 1 wherein the notice of vehicle information is a notice of failure.

* * * * *